(12) United States Patent
Daoud

(10) Patent No.: US 6,226,439 B1
(45) Date of Patent: May 1, 2001

(54) SPLICE HOLDER WITH SELF LOCKING FEATURE

(75) Inventor: Bassel Hage Daoud, Parsippany, NJ (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/364,810

(22) Filed: Jul. 30, 1999

(51) Int. Cl.[7] ........................................ G02B 6/00
(52) U.S. Cl. .................... 385/137; 385/134; 385/135; 385/136
(58) Field of Search .................... 385/134–137, 385/147

(56) References Cited

U.S. PATENT DOCUMENTS 5,530,786 * 6/1996 Radiff et al. ........................ 385/136
5,566,268 * 10/1996 Radiff et al. ........................ 385/137
5,566,269 * 10/1996 Eberle, Jr. et al. .................. 385/137

* cited by examiner

Primary Examiner—John D. Lee
Assistant Examiner—Sarah N Song
(74) Attorney, Agent, or Firm—Howard C. Miskin; Gloria Tsui-Yip

(57) ABSTRACT

A splice holder for securing and retaining fiber optic splices. The splice holder facilitates insertion and prevents accidental dislodgment of splices by providing a self locking feature. The splice holder comprises at least two spaced apart members in parallel alignment extending from a base. Adjacent pairs of members define a channel for retaining the splice. Each member comprises two spaced apart pliable and resilient sidewalls in parallel alignment and interconnected by a pliable and resilient tab near the upper ends of each sidewall with a portion of each sidewall extending above the tab to form a protrusion.

5 Claims, 3 Drawing Sheets

SPLICE HOLDER WITH SELF LOCKING FEATURE

FIELD OF THE INVENTION

The invention relates to a device for securing and retaining fiber optic splices, which facilitates insertion and prevents accidental dislodgment by providing a self locking feature.

BACKGROUND OF THE INVENTION

Telecommunications utilizing fiber optic technology improves the quality of communications and can handle a higher volume of voice and data transfer than similar sized copper electrical wiring and cables. To provide interconnections between widely separated points, splicing is required to join cables and wires. The splices are used, in part, to interconnect subscribers to a telecommunication provider, such as a telephone service provider.

Two common types of fiber optic splices are the single fusion splice and the mass fusion splice, both generally known in the art of fiber optic technology. Due to the need to maintain the quality of transmission over the spliced connection, splices are secured in some manner, such as a splice holder, to prevent undesired agitation and/or damage. A splice holder also organizes and arranges the splices to facilitate identification and servicing by a technician. Splice holders are typically made of a foam material. Splice holders are placed on a fiber optic tray forming part of a distribution panel usually located in a basement of a subscriber.

A prior art single fusion splice holder may be further described with reference to FIG. 1. FIG. 1 shows a splice holder 10 comprising seven parallel, spaced apart members $11_1 \ldots 11_7$ extending upwardly from an integral base 12. Each adjacent pair of members, such as $11_1$–$11_2$, defines a C-shape channel 13 therebetween having a constricted neck 14. Splice holder 10 typically further comprises a plastic housing (not shown) for mounting the base 12 to provide further structural support to splice holder 10.

As shown in FIG. 1, a single fusion splice 15 rests along the length of channel 13, which has a cross-section generally corresponding to that of splice 15 to provide frictional hold. Constricted neck 14 being dimensioned to be slightly narrower than the width of splice 15 further frictionally secures splice 15 along channel 13. However, constricted neck 14 disadvantageously interferes with the insertion of splice 15 along channel 13. Furthermore, although members 11 are made of foam and allow their corresponding compression and temporarily widening of the constricted neck 14 in accepting a splice 15, the resiliency of members 11 diminish over time after repeated insertion and removal of splice 15, resulting in a channel 13 without a constricted neck 14 for securing splice 15.

Therefore, there is a need for an improved splice holder for securing splices, facilitating insertion and preventing accidental dislodgment by providing a self locking feature.

SUMMARY OF THE INVENTION

The invention provides a holder for securing and retaining fiber optic splices. The improved splice holder of the present invention provides easy insertion and affirmation retention of splices.

The splice holder of this invention comprises a base having at least one set of a plurality of spaced apart members in parallel alignment extending therefrom. Each adjacent pair of members defines a generally U-shape channel therebetween for situating and retaining a splice. Each member comprises two spaced apart upwardly extending pliable and resilient sidewalls in parallel alignment to each other, interconnected by a generally pliable tab generally parallel to the base and at the upper end of each sidewall. A small protrusion extends from each sidewall above the interconnecting tab.

The upper entry portion of each U-shape channel has a predetermined width corresponding to the width of a splice to be placed therein to facilitate insertion of the splice. The upper entry portion is wider than the lower portion such that upon inserting a splice, the opposing sidewalls of adjacent members deflect or buckle to accommodate the splice, causing the opposing sidewalls to arch and urging the corresponding protrusions toward each other thereby hugging the splice and narrowing the upper entry portion of the channel to affirmatively secure the splices along the channel to prevent accidental dislodgment.

It will be appreciated that, for purposes of illustration, these figures are not necessarily drawn to scale.

DETAILED DESCRIPTION OF THE PREFERRED EMBODIMENTS

Figure 1:
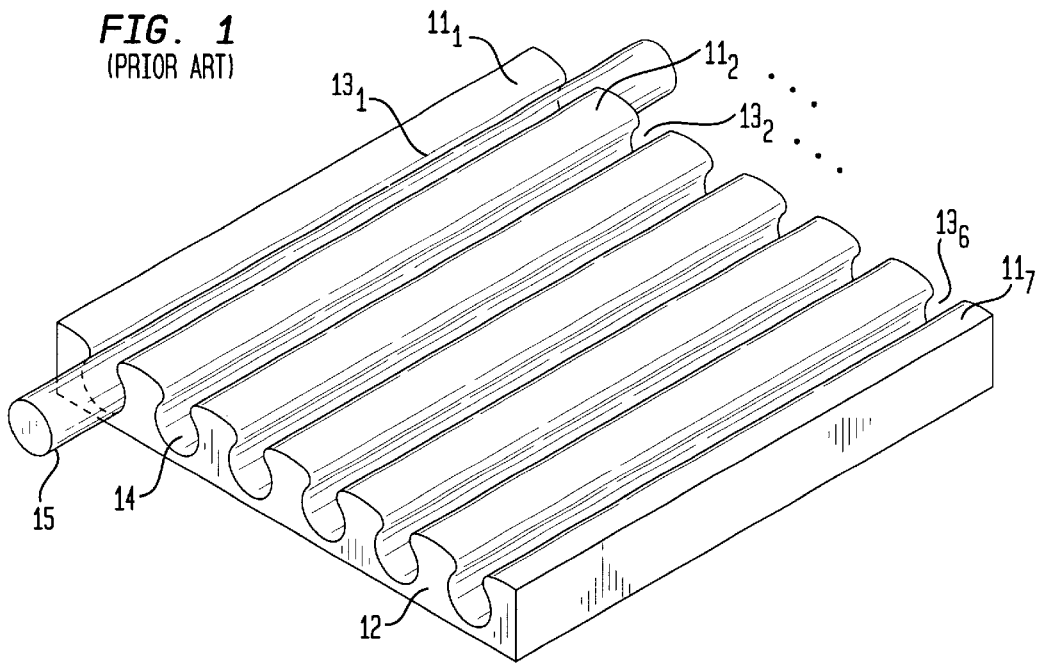
FIG. 1 is a perspective view of a prior art splice holder.
Figure 2:
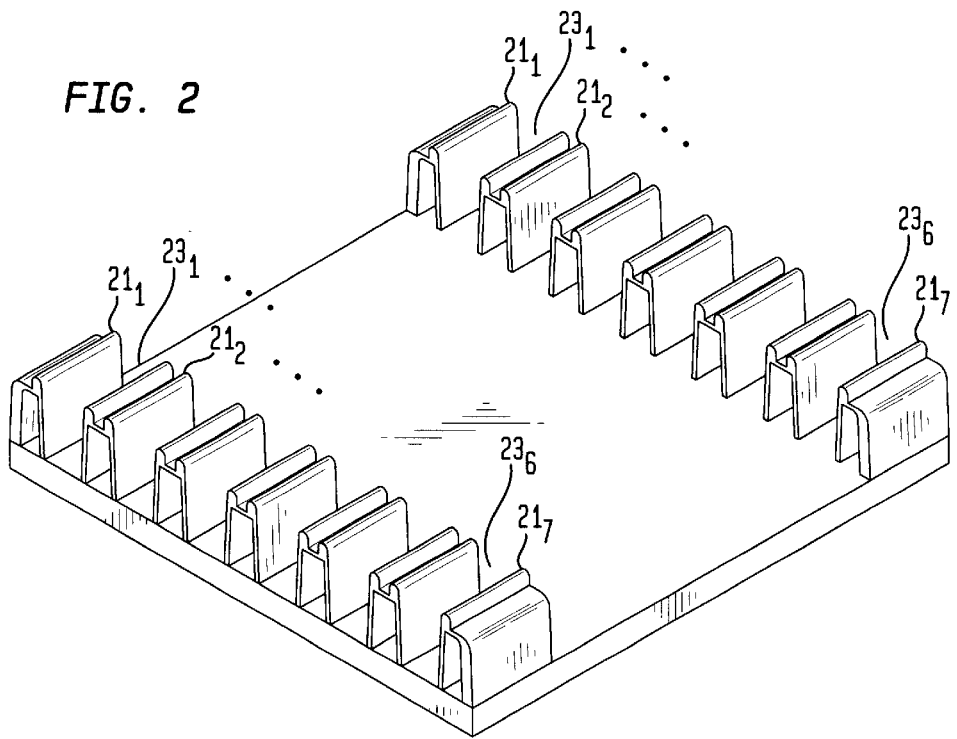
FIG. 2 is perspective view of a splice holder of the present invention.

With reference to the drawings, wherein the same reference number indicates the same element throughout, there is shown in FIG. 2 a splice holder 20 of the present invention.

Figure 3:
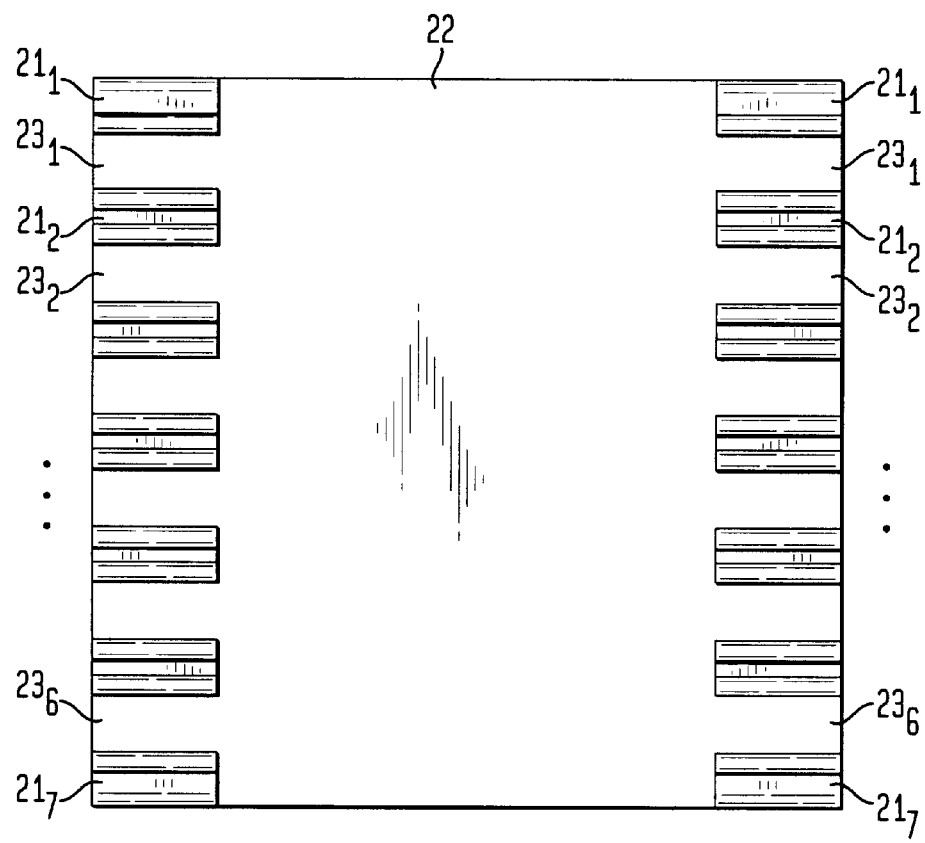
FIG. 3 is a top plan view of the splice holder of the present invention, illustrating two sets of spaced apart members in parallel alignment.
Figure 4:
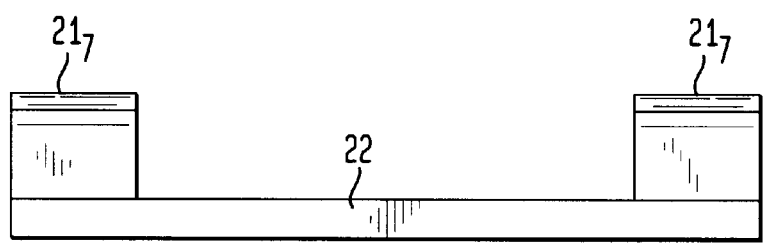
FIG. 4 is a side view of the splice holder of the present invention, illustrating two sets of members on both sides of the base.
Figure 7:
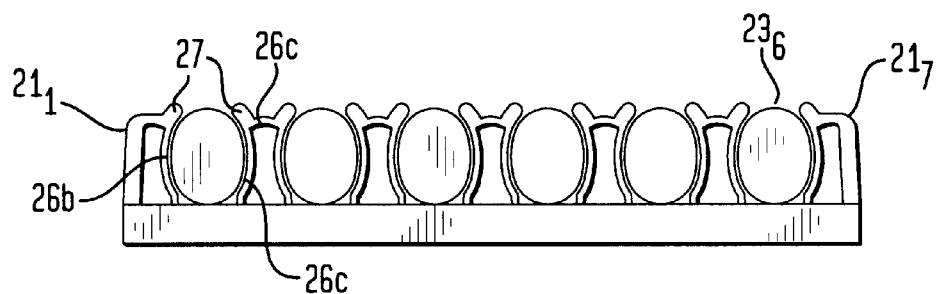
FIG. 7 is a front elevational view of the splice holder of the present invention, illustrating the self-locking, affirmative retention of the splices along the channels.

As shown in FIG. 2, splice holder 20 comprises two sets of spaced apart members $21_1 \ldots 21_7$ in parallel alignment and extending upwardly from a base 22. The two sets of members 21 are on opposite sides of base 22 (best shown in FIGS. 3 and 4). Each adjacent pair of members, such as $21_1$–$21_2$, defines a U-shape channel $23_1 \ldots 23_6$ therebetween for situating and retaining a splice 28 (as shown in FIG. 7). Corresponding channels such as $23_1$–$23_1$ of the two sets of members 21 are in longitudinal axial alignment (best shown in FIG. 3) and cooperatively secure two ends of a splice (not shown). Although two sets of members 21 are shown in FIG. 2, more or less sets of members 21 on base 22 can serve to secure and retain the splices.

Figure 5:
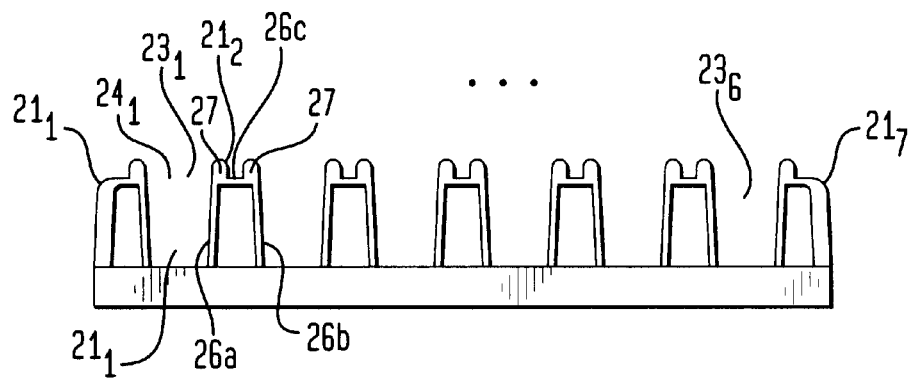
FIG. 5 is a front elevational view of the splice holder of the present invention, illustrating the pair of sidewalls interconnected by a tab near their upper ends of each member, with adjacent pairs of members defining a U-shape channel.

As shown in FIG. 5, each U-shape channel 23 has an upper entry portion 24 wider than the lower portion 25 where a splice 28 situates as shown in FIG. 7. Each member 21 comprises two spaced apart, upwardly extending sidewalls 26a and 26b in parallel alignment to each other. Sidewalls 26a and 26b are interconnected near their upper ends by a tab 26c generally parallel to base 22 such that the upper ends extend above tab 26c to form a pair of protrusions 27. Although each member 21 can be identical, the two end members $21_1$ and $21_7$ shown in FIG. 5 require only one protrusion 27 each extending above tab 26c from the sidewall adjacent to a channel 23, to be described with FIG. 7. All three components 26a, 26b and 26c of member 21 are made of a pliable and resilient material, preferably an elastic or rubber type material.

Figure 6:
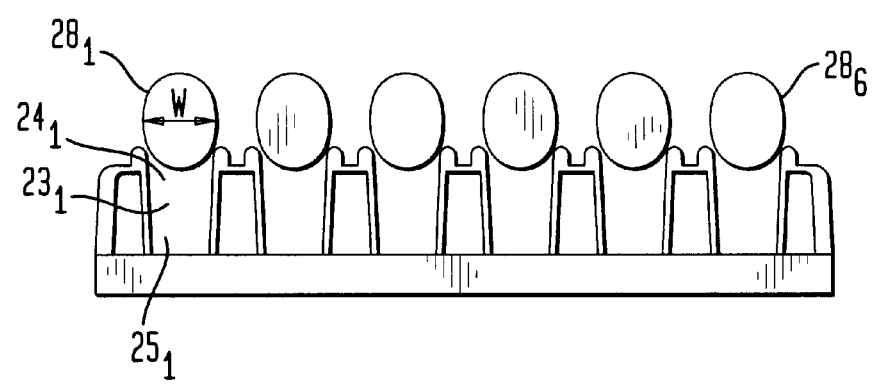
FIG. 6 is a front elevational view of splice holder of the present invention, illustrating the easy insertion of splices along the channels.

FIG. 6 shows the positioning of splices $28_1 \ldots 28_6$ for insertion along channels $23_1 \ldots 23_6$. The wider entry portion 24 is dimensioned to correspond with the width W of splice 28 to facilitate insertion. The lower portion 25 is narrower than the entry portion 24 and the width W of splice 28.

Upon insertion of splice 28 into channel 23, FIG. 7 illustrates that the width W of splice 28 forces opposite sidewalls 26a and 26b of adjacent members 21 to deflect to accommodate splice 28. The bending of sidewalls 26a and 26b cause the protrusions 27 to close in over the splice 28 and the tab 26c to arch, thereby narrowing entry portion 24 to lock splice 28 along channel 23 to prevent accidental dislodgment. Removal of splice 28 is accomplished by pulling splice 28 upward against protrusions 27 to widen the entry portion 24 of channel 23. With the entry portion 24 returning to its original width, sidewalls 26a and 26b unbend to force splice 28 out of channel 23.

As shown in FIG. 7, the two end members $21_1$ and $21_7$ have only one protrusion 27 each extending above tab 26c from the sidewalls adjacent to channel $23_1$ and $23_6$ since the other sidewalls of the end members $21_1$ and $21_7$ are not used to retain splices.

The width of entry portion 24 of channel 23 can vary depending on the width of the splice to be held by the splice holder 20.

Splice holder 20 of the present invention can be mounted on a plastic base to provide additional structural support to the splice holder.

Although certain features of the invention have been illustrated and described herein, other better modifications and changes will occur to those skilled in the art. It is, therefore, to be understood that the appended claims are intended to cover all such modification and changes that fall within the spirit of the invention.

What I claim is:

1. A device for securing and retaining at least one fiber optic splice comprising:

a base having at least one set of at least two spaced apart members in parallel alignment extending therefrom;

each adjacent pair of said members defining a channel therebetween for retaining said splice;

each of said members comprising first and second spaced apart pliable sidewalls in parallel alignment extending from said base and having upper ends remote from said base;

said first and second sidewalls of each member being interconnected adjacent said upper ends by a pliable tab and a small protrusion extending beyond said tab from each sidewall.

2. The device according to claim 1 wherein said channel being generally U-shape and having an upper entry portion and a lower portion, said upper entry portion being wider than said lower portion.

3. The device according to claim 2 wherein said splice having a predetermined width and said upper entry portion having a predetermined width corresponding to that of said splice to facilitate insertion of said splice along said channel such that upon insertion of said splice, said first and second sidewalls of said adjacent pair of members deflect to accommodate said width of said splice, urging said protrusions from said first and second sidewalls towards each other and narrowing the width of said upper entry portion to prevent accidental dislodgment of said splice from said channel.

4. The device according to claim 3 having first and second sets of at least two members, said base having first and second side wherein said first set of members extend from said first side and said second set of members extend from said second side such that each channel from said first set is in longitudinal axial alignment with a corresponding channel from said second set to cooperatively secure said splice.

5. The device according to claim 4 wherein each of said members is made of a rubber material.

* * * * *